United States Patent [19]
Shimozawa et al.

[11] Patent Number: 4,746,558
[45] Date of Patent: May 24, 1988

[54] MAGNETIC RECORDING MEDIUM

[75] Inventors: Toru Shimozawa; Kazunori Tamazaki, both of Saku; Masaharu Nishimatsu, Komoro, all of Japan

[73] Assignee: TDK Corporation, Tokyo, Japan

[21] Appl. No.: 841,224

[22] Filed: Mar. 19, 1986

[30] Foreign Application Priority Data

Mar. 27, 1985 [JP] Japan .................................. 60-60963

[51] Int. Cl.$^4$ .............................................. G11B 5/70
[52] U.S. Cl. ................................... 428/141; 427/131; 428/323; 428/694; 428/900
[58] Field of Search ............... 428/694, 900, 323, 141; 427/128, 131

[56] References Cited

U.S. PATENT DOCUMENTS

| | | | |
|---|---|---|---|
| 4,183,976 | 1/1980 | Yamada et al. | 427/131 |
| 4,442,159 | 4/1984 | De Zawa et al. | 427/131 |
| 4,511,617 | 4/1985 | Hideyama et al. | 427/128 |
| 4,547,419 | 10/1985 | Nishimatsu et al. | 427/131 |
| 4,585,697 | 4/1986 | Kato | 428/694 |
| 4,596,747 | 6/1986 | Nishimatsu et al. | 427/131 |

*Primary Examiner*—Paul J. Thibodeau
*Attorney, Agent, or Firm*—Oblon, Fisher, Spivak, McClelland & Maier

[57] ABSTRACT

A magnetic recording medium comprising a non-magnetic substrate and a coating type magnetic recording layer formed on the substrate, wherein barium ferrite magnetic powder is perpendicularly oriented, characterized in that an undercoating layer comprising a radiation curable binder and carbon black, is provided beneath the magnetic recording layer.

3 Claims, 1 Drawing Sheet

MAGNETIC RECORDING MEDIUM

BACKGROUND OF THE INVENTION

1. Field of the Invention

The present invention relates to a magnetic recording medium having a coating type magnetic recording layer wherein ferromagnetic particles are perpendicularly oriented. More particularly, the present invention relates to a magnetic recording medium which has a feature in the composition of an undercoating layer beneath the magnetic recording layer.

2. Description of the Prior Art

Magnetic recording media are now widely used in the fields of audio and video recording, computers, magnetic discs, etc., and they are expected to be used in the fields of video floppies, etc. Accordingly, the amount of information to be recorded on magnetic recording media increases year after year, and there is an increasing demand for the improvement of the recording density of magnetic recording media.

With respect to the magnetic recording media such as magnetic tapes, it has been common to improve the magnetic characteristics by e.g. orienting acicular magnetic particles in a magnetic recording layer in a longitudinal direction. However, those with acicular magnetic particles oriented in a longitudinal direction are not suitable for a high density recording although they are capable of obtaining a high output in a low frequency region.

For this reason, it has been recently proposed to use a magnetic recording medium wherein a plate crystal barium ferrite magnetic powder having an easily magnetizable axis in a perpendicular direction, is used for a magnetic recording layer (Japanese Unexamined Patent Publication No. 195328/1982).

However, such a medium wherein the barium ferrite magnetic powder is used, has a difficulty that erase characteristics are inferior although it is excellent in the short wavelength recording characteristics. Besides, barium ferrite has by itself an electric resistance of as high as at least $10^{16}$ $\Omega/cm^2$, and accordingly, in the case where no conductive substance such as carbon black is used in combination with barium ferrite, the magnetic recording medium is likely to adhere to the head, or is likely to adhere to guide rollers, calender rollers, etc. during the production process such as a coating process. In an extreme case, an electric discharge noise will be generated. Under the circumstances, it is natural to consider the use of a conductive substance in combination with the magnetic powder, and it has been proposed to incorporate carbon black into the magnetic recording layer to reduce the electric resistance. However, if the amount of the incorporation is substantial, it is inevitable that the magnetic density lowers. Therefore, it is necessary to reduce the amount of carbon black in order to attain a high density. However, if the amount of carbon black is reduced, the generation of the discharge noise is inevitable.

SUMMARY OF THE INVENTION

The present inventors have conducted researches to overcome the above difficulties. As a result, they have found it possible to solve such problems by providing a carbon black-containing underlayer beneath the magnetic recording layer. The present invention has been accomplished based on this discovery.

Namely, the present invention provides a magnetic recording medium comprising a non-magnetic substrate and a coating type magnetic recording layer formed on the substrate, wherein barium ferrite magnetic powder is perpendicularly oriented, characterized in that an undercoating layer comprising a radiation curable binder and carbon black, is provided beneath the magnetic recording layer.

BRIEF DESCRIPTION OF THE DRAWING

In the accompanying drawings.

DETAILED DESCRIPTION OF THE INVENTION

Figure 1:
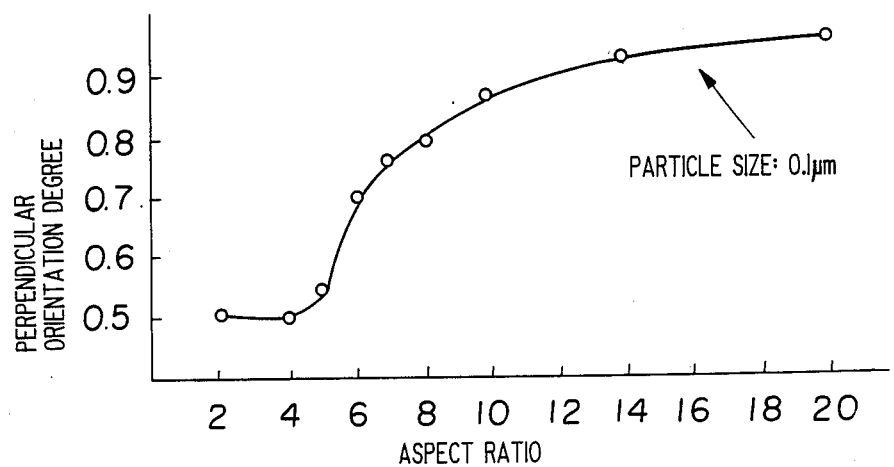
FIG. 1 is a graph illustrating the relation between the aspect ratio and the perpendicular orientation degree of barium ferrite.

The ferromagnetic particles to be used in the present invention are barium ferrite magnetic powder. The barium ferrite magnetic powder is hexagonal system plate crystals and is represented by the formula of $BaO.6Fe_2O_3$. Further, it includes a ferrite of the same formula wherein a part of Ba and Fe is replaced by a metal such as Ti, Cr, Co, Zn, In, Mn, Cu, Ge, Nb, Ca, Sr, Pb or Ni.

The barium ferrite magnetic powder has a diameter of at most 0.2 $\mu$m, preferably at most 0.15 $\mu$m, more preferably at most 0.1 $\mu$m. The aspect ratio is preferably at least 6, more preferably at least 7. The barium ferrite is hexagonal system plate crystals, and as such it gives a greater effect to the surface roughness of the resulting magnetic recording layer than an acicular magnetic powder. If the diameter is larger than the above range, the surface roughness tends to decrease substantially. Whereas, when the particle size is within the above-mentioned range, the perpendicular components can adequately be utilized so that the surface smoothing property of the magnetic layer will be satisfactory, whereby the noize can adequately be reduced and high density recording can be attained.

As a method for producing barium ferrite, there may be employed a ceramic method, a co-precipitation-burning method, a hydrothermal synthetic method, a flux method, a glass crystallization method, an alkoxide method or a plasma jet method.

The carbon black to be used for the undercoating layer of the present invention may be any carbon black produced by any one of conventional methods, such as furnace, channel, acetylene, thermal or lamp. However, acetylene black, furnace black, channel black, roller and disc black and German naphthalene black are preferred. The particle size of the carbon black to be used in the present invention is not critical, but it is preferably from 10 to 100 m$\mu$m, more preferably from 10 to 80 m$\mu$m, as measured by an electron microscopic photography. If the particle size exceeds 100 m$\mu$m, the surface roughness of the undercoating layer tends to be inferior, thus leading to a deterioration of the electromagnetic conversion characteristics after the application of the magnetic layer. On the other hand, if the particle size is less than 10 m$\mu$m, the dispersion will be inadequate whereby the surface roughness of the undercoating layer will also be inferior.

As a special type of carbon black, there is graphitized carbon black. In the present invention, such graphitized carbon black may also be employed.

The graphitized carbon black has, at its surface, a shell-like structure wherein carbon layers are arranged in parallel to one another, and a void space is observed at a portion close to the interior center. Some of graphitized carbon black have a somewhat angular hollow capsule-like structure. Thus, the graphitized carbon black is different from usual carbon black in the structure, and can clearly be distinguished by means of an electron microscope. The surface shell is smooth probably because of graphitization.

The graphitized carbon black has distinguished characteristics that it has very little content of impurities such as S or Cl found in usual carbon black and the hygroscopicity is weak. The dispersibility of carbon black is usually inferior when the hygroscopicity is weak. However, in the case of the graphitized carbon black, the dispersibility is not reduced despite the low water content. The surface is graphitized to form a shell. Thus, friction is extremely low, and the hygroscopicity is weak. Therefore, those containing the graphitized carbon black in the magnetic layer, are particularly effective when used under a high temperature and high humidity condition. Similar effectiveness is obtained also when it is incorporated in the undercoating layer.

Carbon black has a conductivity, and the smaller the particle size, the better the conductivity. In the graphitized carbon black, the conductivity increases as the graphitization of the crystal structure of particles proceeds. Further, volatile matters or oily components on the surface of the carbon black impair the conductivity, and it is possible to improve the conductivity by removing such volatile matters or oily components. Thus, it is advantageous to employ the graphitized carbon black also from the antistatic point of view. It is possible to obtain a magnetic recording medium with minimum dropouts by using the graphitized carbon black.

The graphitized carbon black which may be used in the present invention is obtained by heat-treating carbon black such as acetylene black, furnace black, channel black, roller and disc black or German naphthalene black at a temperature of from 2,700° to 3,000° C., and it has an average particle size of from 10 to 100 m$\mu$m, preferably from 10 to 80 m$\mu$m, a specific surface area of from 20 to 300 m$^2$/g as measured by BET method, and a volatile matter of at most 1.0%. For instance, #4000B (tradename, manufactured by Mitsubishi Chemical Industries Ltd.) may be mentioned.

The graphitized carbon black which may be used in the present invention preferably has a pH of 8 or more.

As compared with a magnetic recording medium wherein carbon black is incorporated only in the undercoating layer, the one combined with a magnetic layer containing carbon black, particularly graphitized carbon black, is advantageous in that dropouts can thereby be further reduced.

Into the magnetic recording layer and the undercoating layer of the present invention, an organic binder, an inorganic pigment, a lubricant and other additives such as a dispersing agent and an antistatic agent which are commonly employed, may be incorporated in accordance with usual methods.

As an undercoating layer, it has been proposed to provide a non-magnetic primer coating layer on a film substrate to improve the adhesive strength. Various thermoplastic resins or thermosetting resins have been employed as the resin binder for the formation of the primer coating layer. In the case where a thermoplastic resin primer is used, there is a problem such that when a magnetic coating material containing a substantial amount of a solvent, is applied, it is likely that the previously formed primer coating layer is swelled or dissolved by the solvent, whereby the coating will be uneven and the smoothness of the magnetic layer will be lost. In the case where a thermosetting resin primer is employed, the above problem may be avoided, but there is an industrial disadvantage that the heat-curing treatment requires a long period of time, whereby it is impossible to continuously form the magnetic layer. Further, the adhesion may take place between the undercoating layer and the base film at the time of thermosetting. Therefore, the useful resins were limited, and it was impossible to use a resin which caused a tack. Further, it may happen that the surface of the undercoating layer is roughened due to the adhesion or the tightening of the winding.

The above-mentioned problem in the primer treatment of the magnetic recording medium, can be solved by using a predetermined radiation curable resin as the binder for forming the primer coating layer. Namely, it is thereby possible to adequately prevent electrostatic charge by the treatment for a short period of time, to form a primer coating layer having excellent solvent resistance and adhesion, and to continously coat the magnetic layer to obtain a magnetic recording medium having excellent surface smoothness, electric characteristics and mechanical strength.

Namely, in a magnetic recording medium prepared by applying a non-magnetic primer coating layer on a substrate, followed by the formation of a magnetic layer, the above-mentioned effect can be attained by a magnetic recording medium wherein the primer coating layer is formed by applying radiation to a radiation curable coating material such as a coating material comprising one or more oligomers or polymers containing at least two (meth)acryloyl groups, each having a molecular weight of at least 200 and, if necessary, a solvent or a photopolymerization initiator.

When coated on a substrate and irradiated, such a primer coating material instantaneously undergoes crosslinking and forms a coating layer having a three-dimensional network structure. The coating layer thus formed, does not undergo swelling even when contacted with a solvent at the time of the application of the magnetic layer, whereby it is possible to maintain the smoothness of the magnetic layer.

In short, the present invention provides a magnetic recording medium having a low electrostatic property, excellent surface smoothness and good adhesion of the magnetic layer by using, as the primer coating layer, a dispersion of carbon black in a radiation curable coating material composed of molecules containing radiation sensitive (radiation curable) double bonds.

The conductive material is dispersed only in the primer coating layer and not in the magnetic layer. Nevertheless, the surface resistance of the magnetic layer is substantially reduced by the presence of the primer coating layer, whereby it is possible to minimize the electrostatic charge and the consequential problems such as sticking of the tape or the dropouts, and it is possible to overcome a problem that the tape winding appearance deteriorates during the use or during the process for the production. Furthermore, because of the presence of the undercoating layer, the adhesive strength is improved and it is thereby to possible to prevent the magnetic layer from falling off even when a strong stress is applied to the tape instantaneously.

It is more effective to combine an antistatically treated magnetic layer with an undercoating layer which contains carbon black or graphitized carbon black.

The above-mentioned carbon black, graphitized carbon black and a surfactant as an antistatic agent, may be used alone or in combination for the magnetic layer.

As anionic surfactants, there may be mentioned fatty acid soaps; ether carboxylic acids and their salts; carboxylates such as condensation products of (higher) fatty acids and amino acids; sulfuric acid derivatives such as sulfuric acid esters of (higher) alcohols, sulfuric acid esters of alkyl or alkylallyl ethers, sulfuric acid esters of (higher) fatty acid esters and sulfuric acid esters of (higher) fatty acid alkylolamides; phosphoric acid derivatives such as alkyl phosphates, alkyl phosphoric acid esters made from (higher) alcohols, phosphoric acid amides, and natural surfactants such as lecithin and cephalin; pentaalkyl polyphosphates; hexaalkyl tetrapolyphosphates; dialkyl phosphonates; and sulfonic acid derivatives such as (higher) alkyl sulfonates, α-olefin sulfonates, sulfonates of (higher) fatty acid esters, dialkyl sulfosuccinates, sulfonates of (higher) fatty acid amides and alkylbenzene sulfonates.

As cationic surfactants, there may be mentioned amines such as alkyl amine salts, polyamines and fatty acid derivatives of amino alcohols; quaternary ammonium salts such as alkyl quaternary ammonium salts, alkyltrimethyl ammonium salts, alkylamide quaternary ammonium salts, dialkyldimethyl ammonium salts, alkyldimethylbenzyl ammonium salts, cyclic quaternary ammonium salts and ether linkage quaternary ammonium salts; imidazolines such as imidazoline and polyoxyethylene-addition phosphates; amine-oxyethylene adducts such as polyoxyethylenealkyl amines and alkyl amine oxides; and phtic acid quaternary salts.

As nonionic surfactants, there may be mentioned alkyl ethers, polyhydric alcohols such as polyethylene glycol; esters of polyhydric alcohols such as polyoxydisorbitan fatty acid esters, polyoxyethylene glycerol fatty acid esters and polyoxyethylene propylene glycol monofatty acid esters; alkylphenol-oxyethylene adducts such as oxyethylene derivatives of polyoxyethylene alkylphenyl ether-alkylphenol-formalin condensation products; amide-oxyethylene adducts such as fatty acid amides of e.g. oxyethylene fatty acid esters, (higher) fatty acid glycerin esters, sorbitan fatty acid esters, sucrose fatty acid esters and pentaerythritol fatty acid esters; amine-oxyethylene adducts such as triethanolamine fatty acid partial esters; amides such as alkylolamides.

As amphoteric surfactants, there may be mentioned amino acids, betaine-type carboxylic acids, sulfonic acid-type sulfonic acids, metal salts such as amide-type metal salts, and alkyl betaines such as an alkyl betaine, alkyl amide betaine and imidazorium betaine.

The surfactant is used usually in an amount of from 1 to 20 parts by weight.

As the organic binder for the undercoating layer of the present invention, a radiation curable compound is used. The radiation curable compound is a compound containing at least two unsaturated double bonds in its molecular chain, which are capable of generating radicals for crosslinking when irradiated. Such a compound may also be obtained by subjecting a thermoplastic resin to radiation sensitive modification.

As specific examples of the radiation curable resin, there may be mentioned a resin, an elastomer, an oligomer, a polymer and a monomer, which contains or is incorporated with, in its molecule of a thermoplastic resin, radiation curable or polymerizable groups such as acrylic double bonds of acrylic acid, methacrylic acid or their ester compounds containing unsaturated double bonds having radical polymerizability, allyl-type double bonds of e.g. diallyl phthalate, or unsaturated bonds of e.g. maleic acid or a maleic acid derivative. Any other compounds having a radiation cross-linkable or polymerizable unsaturated double bond may likewise be employed.

It is preferred to use a compound containing at least two (meth)acryloyl groups per molecule, the molecular weight being at least 200 per each acryloyl group. If the molecular weight per (meth)acryloyl group is less than 200, the resin component tends to undergo a substantial volumetric shrinkage at the time of the crosslinking (curing) reaction, whereby the substrate will be curled, thus leading to poor dimensional stability and deterioration of the adhesion of the undercoating layer.

Among low molecular weight monomers, there are many compounds having low boiling points, which tend to evaporate during the drying and curing operation, and are likely to create an industrial problem. However, even such low molecular monomers may provide excellent properties when used in combination with a resin component having a high molecular weight.

In the case where two or more radiation curable oligomers or polymers are used in combination, it is particularly advantageous to employ a radiation curable coating material containing at least two components selected from the group consisting of the following (A), (B) and (C):

(A) a compound containing at least two radiation curable unsaturated double bonds and having a molecular weight of at least 5000, preferably at least 8000;

(B) a compound containing at least one radiation curable unsaturated double bond and having a molecular weight of at least 400 and less than 5000, preferably from 600 to 3000; and (C) a compound containing at least one radiation curable unsaturated double bond and having a molecular weight of less than 400.

It is particularly preferred that the radiation curable coating material comprises at least two components selected from the groups (A), (B) and (C) in the respective proportions of from 0 to 90% by weight of (A), from 0 to 80% by weight of (B) and from 0 to 50% by weight of (C). Further, it is also possible to employ a radiation curable coating material comprising (A) and (B) in the respective proportions of from 20 to 95% by weight of (A) and from 5 to 80% by weight of (B). The radiation curable coating material may contain from 1 to 10% by weight of a photosensitizer for photopolymerization.

As resins containing radiation cross linkable or polyemrizable groups in the molecule of a thermoplastic resin, there may be mentioned the following unsaturated polyester resin.

Namely, there may be mentioned a polyester compound containing radiation curable unsaturated double bonds in its molecular chain, such as an unsaturated polyester resin containing radiation curable unsaturated double bonds, which is prepared by substituting maleic acid for a part of polybasic acids in a saturated polyester resin comprising an ester bond of a polybasic acid with a polyhydric alcohol, as mentioned hereinafter in the item (2). A radiation curable unsaturated polyester resin may be prepared by a conventional method by an addition of e.g. maleic acid or fumaric acid to at least one polybasic acid component and at least one polyhydric alcohol component, i.e. by subjecting the mixture to a dehydration or alcohol removal reaction in the presence of a catalyst at a temperature of from 180° to 200° C. in a nitrogen atmosphere, then raising the temperature to from 240° to 280° C. and conducting a condensation reaction under a reduced pressure of from 0.5 to 1 mmHg. The content of maleic acid or fumaric acid is from 1 to 40 mol %, preferably from 10 to 30 mol % in the acid component, in view of the cross linking at the time of the production and the radiation curable property.

As examples of the thermoplastic resins which can be modified into the radiation curable resins, the following resins may be mentioned.

(1) Vinyl chloride type copolymers:

There may be mentioned a vinyl chloride-vinyl acetate-vinyl alcohol copolymer (which may contain a carboxylic acid), a vinyl chloride-vinyl alcohol copolymer (which may contain a carboxylic acid), a vinyl chloride-vinyl alcohol-vinyl propionate copolymer, a vinyl chloride-vinyl acetate-maleic acid copolymer, and a vinyl chloride-vinyl acetate-OH-terminated side chain alkyl group copolymer, such as VROH, VYNC, VYEGX, VERR, VYES, VMCA, OR VAGH manufactured by UCC (Union Carbide Corporation, U.S.A.).

These copolymers can be modified to radiation-sensitive resins by introducing into them acrylic double bonds, maleic double bonds or allyl-type double bonds by the process described later.

(2) Saturated polyester resins:

There may be mentioned saturated polyester resins obtained by the esterification of saturated polybasic acids such as phthalic acid, isophthalic acid, terephthalic acid, succinic acid, adipic acid or sebacic acid, with polyhydric alcohols such as ethylene glycol, diethylene glycol, glycerol, trimethylol propane, 1,2-propylene glycol, 1,3-butanediol, dipropylene glycol, 1,4-butanediol, 1,6-hexanediol, pentaerythritol, sorbitol, glycerin, neopentyl glycol or 1,4-cyclohexane dimethanol, and resins obtained by the modification of these polyester resins with e.g. SO$_3$Na.

These resins can be modified to radiation-sensitive resins in a similar manner.

(3) Polyvinyl alcohol type resins:

There may be mentioned polyvinyl alcohol, butyral resins, acetal resins, formal resins, and copolymers of these components.

The hydroxyl groups contained in these resins can be modified to be radiation-sensitive by the process described hereinafter.

(4) Epoxy type resins and phenoxy resins:

There may be mentioned epoxy resins obtained by the reaction of bisphenol A with epichlorohydrin, methylepichlorohydrin or the like, such as EPIKOTE 152, 154, 828, 1001, 1004 and 1007 (manufactured by Shell Chemical Company); DEN431, DER732, DER511 and DER331 (manufactured by Dow Chemical Company); EPICLON-400 and EPICLON-800 (manufactured by Dai-Nippon Ink K.K.); phenoxy resins such as PKHA, PKHC and PKHH which are the highly polymerized resins among the above-mentioned epoxy resins, and are manufactured by Union Carbide Corporation; and copolymers of brominated bisphenol A with epichlorohydrin, such as EPICLON 145, 152, 153 and 1120 (manufactured by Dai-Nippon Ink & Chemicals Co.).

The radiation-sensitive modification is effected by utilization of the epoxy groups contained in these resins.

(5) Cellulose derivatives:

Various cellulose derivatives may be employed. Particularly effective are nitrocellulose, cellulose acetobutylate, ethyl-cellulose, butyl-cellulose, acetyl-cellulose, and so forth.

These cellulose derivatives are modified to radiation-sensitive resins by activating the hydroxyl groups in the resins by the process mentioned hereinafter.

Besides the above, the resins which may also be used effectively for the radiation-sensitive modification are polyfunctional polyester resins, polyether ester resins, polyvinyl pyrrolidone resins and derivatives thereof (e.g., PVP olefin copolymers), polyamide resins, polyimide resins, phenol resins, spiro-acetal resins, acrylic resins containing therein at least one acrylic or methacrylic acid ester having a hydroxyl group as the polymerization component, and the like.

Now, there will be given examples of the elastomers and prepolymers.

(1) Polyurethane elastomers and prepolymers:

The use of a polyurethane is particularly effective in that its abrasion resistance and the adhesion to a substrate film such as a PET film are satisfactory.

Examples of such effective urethane compounds are: polyurethane elastomers and prepolymers which are composed of polycondensates of various polyhydric isocyanates, as the isocyanate components, such as 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodule L, Desmodule N, and so on; and various polyesters such as linear saturated polyesters (e.g. those obtained by polycondensation of polyhydric alcohols such as ethylene glycol, diethylene glycol, glycerin, trimethylolpropane, 1,4-butanediol, 1,6-hexanediol, pentaerythritol, sorbitol, neopentyl glycol, 1,4-cyclohexane dimethanol, and so forth with saturated polybasic acids such as phthalic acid, isophthalic acid, terephthalic acid, succinic acid, adipic acid, sebasic acid, and so forth), linear saturated polyethers (e.g. polyethylene glycol, polypropylene glycol, polytetramethylene glycol, and so forth) as well as caprolactum, hydroxyl-containing acrylic acid esters, hydroxyl-containing methacrylic acid esters, and so forth.

It will be highly effective to further react the terminal isocyanate group or hydroxyl group in these urethane elastomers with a monomer having an acrylic double bond, an allyl-type double bond, or the like, to thereby modify the resins to be radiation-sensitive. For instance, there may be mentioned an acryl-modified product of a urethane elastomer (Nippolan 4040), or such a product to which functional groups such as COOH groups are introduced.

Also included in this category are monomers having active hydrogen reactive with an isocyanate group and a radiation curable unsaturated double bond, such as a mono- or di-glyceride of a long chain fatty acid having an unsaturated double bond.

(2) Elastomers of acrylonitrile-butadiene copolymers:

Prepolymers of acrylonitrile-butandiene copolymers containing therein terminal hydroxyl groups, such as "poly BD Liquid Resin" produced by Sinclair Petrochemicals Corp. and available in general market, or elastomers such as "Hycar 1432J" manufactured by Japanese Zeon K.K., and so forth are particularly suitable as the elastomeric components, with which the double bonds in butadiene produce radicals by the radiation rays to cause cross-linking and polymerization.

(3) Polybutadiene elastomers:

Low molecular weight prepolymers having the terminal hydroxyl groups, such as "Poly BD liquid Resin R-15", manufactured by Sinclair Petrochemicals Corp., are particularly suitable in respect of their compatibility with thermoplastic resins. In the "R-15" prepolymer, since the terminal end of the molecule is occupied by the hydroxyl group, it is possible to enhance the radiation sensitivity by adding an acrylic unsaturated double bond to the terminal end of the molecule, whereby the prepolymer becomes much more advantageous as the binder.

Besides, there may be mentioned a reaction product obtained by reacting one molecule of a compound having at least one hydroxyl group per molecule with one isocyanate group of at least one molecule of a polyisocyanate compound, followed by the reaction with at least one molecule of a monomer containing a group reactive with an isocyanate group and a radiation curable unsaturated double bond, i.e. a resin, prepolymer, oligomer or telomer having two acrylic double bonds at the terminals of the molecule, which is obtained by reacting 2 mols of toluene diisocyanate with 1 mol of a bifunctional polyether obtained by the addition of propylene oxide to propylene glycol (Adeka Polyether P-1000, manufactured by Asahi Denka Kogyo K.K.), followed by the reaction with 2 mols of 2-hydroxyethyl methacrylate.

As the compound containing at least one hydroxyl group to be used here, there may be mentioned a polyfunctional ether such as Adeka Polyether P-700, P-1000 or G-1500 (manufactured by Asahi Denka Kogyo K.K.), or Polymeg 1000 or 650 (manufactured by Quaker Oats Co.); and such resins which are further modified with e.g $SO_3Na$ (e.g. Vylon 53S).

Further, cyclized products of polybutadiene such as "CBR-M901" manufactured by Japan Synthetic Rubber Co., also exhibit excellent performance by their combination with the thermoplastic resins.

Further, suitable among other thermoplastic elastomers and their prepolymers are: styrene-butadiene rubbers, chlorinated rubbers, acrylic rubbers, isoprene rubbers and their cyclized products (e.g. "CIR701", manufactured by Japan Synthetic Rubber K.K.), and elastomers such as epoxy-modified rubbers, or internally plasticized saturated linear polyesters (e.g. "Vylon #300", a product of Toyo Spinning K.K.). These may also be used effectively by subjecting them to the modifying treatment for the radiation-sensitization described hereinafter.

As such monomer and oligomer, there may be mentioned styrene, ethyl acrylate, ethylene glycol diacrylate, ethylene glycol dimethacrylate, diethylene glycol diacrylate, diethylene glycol dimethacrylate, 1,6-hexane glycol diacrylate, 1,6-hexane glycol dimethacrylate, N-vinyl pyrrolidone, pentaerythritol tetraacrylate (or methacrylate), pentaerythritol triacrylate (or methacrylate), trimethylol propane triacrylate (or methacrylate), trimethylol propane diacrylate (or methacrylate), an acrylate (or methacrylate) of a phenol ethylene oxide adduct, or compounds of the following formula in which a pentaerythritol condensed ring is substituted by an acryl radical (or a methacryl radical) or an ε-caprolactone-acryl radical:

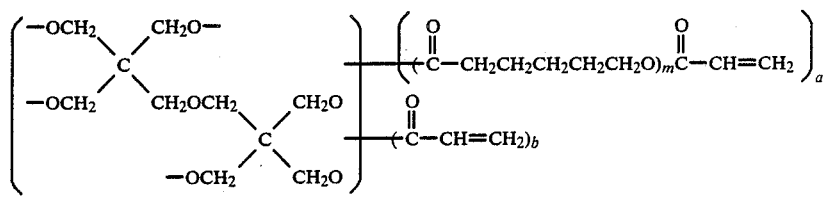

i.e. a compound wherein $m=1$, $a=2$ and $b=4$ (which will be hereinafter referred to as "special pentaerythritol condensation product A"), a compound wherein $m=1$, $a=3$ and $b=3$ (which will be hereinafter referred to as "special pentaerythritol condensation product B"), a compound wherein $m=1$, $a=6$ and $b=0$ (which is hereinafter referred to as "special pentaerythritol condensation product C"), a compound wherein $m=2$, $a=6$ and $b=0$ (which will be hereinafter referred to as "special pentaerythritol condensation product D"), and special acrylates represented by the following formulas:

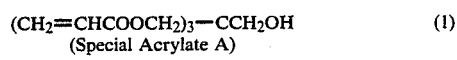
(Special Acrylate A) (1)

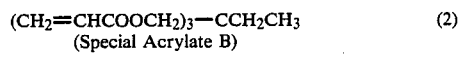
(Special Acrylate B) (2)

($n \approx 3$) (Special Acrylate C) (3)

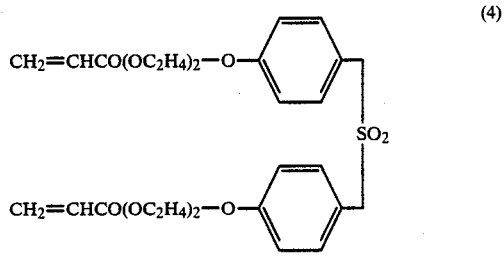
(Special Acrylate D) (4)

-continued

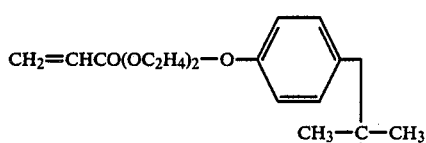

(Special Acrylate E)

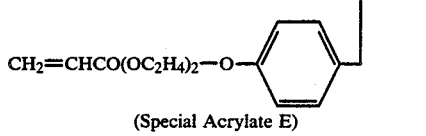

(Special Acrylate F)

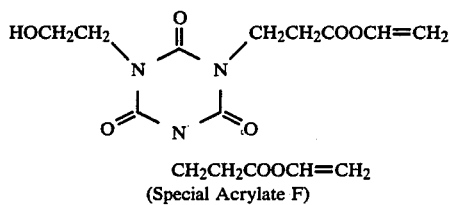

(Special Acrylate G)

$$CH_2=CHCOO-(CH_2CH_2O)_4-COCH=CH_2 \quad (8)$$
(Special Acrylate H)

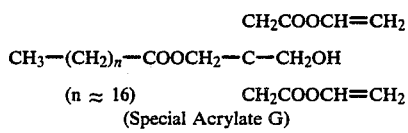

(Special Acrylate I)

(Special Acrylate J)

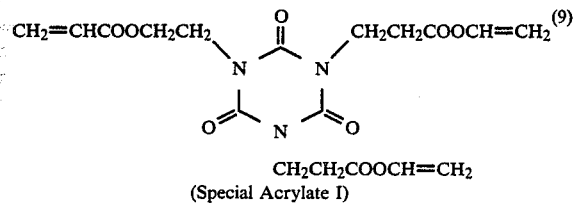

A: acrylic acid, X: polyhydric alcohol,
Y: polybasic acid (Special Acrylate K)

As the compound having radiation curable unsaturated double bonds to be used in the present invention, there may be mentioned styrene, ethyl acrylate, ethylene glycol di(meth)acrylate, diethylene glycol di(meth)acrylate, 1,6-hexaneglycol di(meth)acrylate, trimethylol propane tri(meth)acrylate, a multifunctional oligoester acrylate (Acronix M-7100, manufactured by Toa Gosei Chemical Industries Co. Ltd.), etc.

Now, examples for the syntheses of the radiation curable binders will be given.

(a) Synthesis of an acryl-modified product of a vinyl chloride-vinyl acetate copolymer type resin (radiation-sensitive modified resin):

750 Parts by weight of a partially saponified vinyl chloride-vinyl acetate copolymer (average polymerization degree, n=500) having OH groups, 1250 parts by weight of toluene, and 500 parts by weight of cyclohexanone were charged into a four-necked flask of a 5-liter capacity and dissolved under heating. After raising the temperature to 80° C., 61.4 parts by weight of 2-hydroxyethyl methacrylate adduct of tolylene diisocyanate was added. Further, 0.012 part by weight of tin octylate and 0.012 part by weight of hydroquinone were added, and the reaction was carried out at a temperature of 80° C. in a nitrogen (N₂) stream until the conversion of NCO reached 90%. After completion of the reaction, the reaction system was cooled and diluted by addition of 1250 parts by weight of methyl ethyl ketone.

Production of 2-hydroxyethyl methacrylate (2HEMA) adduct of tolylene diisocyanate (TDI):

348 Parts by weight of tolylene diisocyanate was heated to a temperature of 80° C. in a four-necked flask of one-liter capacity in a nitrogen (N₂) stream. Thereafter, 260 parts by weight of 2-ethylene methacrylate, 0.07 part by weight of tin octylate, and 0.05 part by weight of hydroquinone were added dropwise into a reaction vessel, while cooling to control the temperature inside the reaction vessel to be in a range of from 80° to 85° C. After completion of the dropwise addition, the mixture was stirred for three hours at 80° C. to complete the reaction. After completion of the reaction, the reaction product was taken out of the reaction vessel and cooled to obtain 2-hydroxyethyl methacrylate (2HEMA) adduct of tolylene diisocyanate (TDI) as a white paste.

(b) Synthesis of an acryl-modified product of a butyral resin (radiation-sensitive modified resin): 100 Parts by weight of a butyral resin, "BM-S" produced by Sekisui Chemical Co., was charged into a four-necked flask of a 5-liter capacity, together with 191.2 parts by weight of toluene and 71.4 parts by weight of cyclohexanone, and dissolved under heating. After raising the temperature to 80° C., 7.4 parts by weight of the 2-hydroxyethyl methacrylate adduct of tolylene diisocyanate was added to the solution, followed by further addition of 0.015 part by weight of tin octylate and 0.015 part by weight of hydroquinone. Then, the reaction was carried out at 80° C. in a nitrogen (N₂) stream until the conversion of NCO reached at least 90%. After completion of the reaction, the reaction product was cooled and diluted with methyl ethyl ketone.

(c) Synthesis of an acryl-modified product of a saturated polyester resin (radiation-sensitive modified resin):

100 Parts by weight of "Vylon RV-200" manufactured by Toyo Spinning Co., was dissolved under heating in 116 parts by weight of toluene and 116 parts by weight of methyl ethyl ketone. After raising the temperature to 80° C., 3.55 parts by weight of the 2HEMA adduct of TDI was added, followed by further addition of 0.007 part by weight of tin octylate and 0.007 part by weight of hydroquinone. Then, the reaction was carried out at 80° C. in a nitrogen (N₂) stream until the conversion of NCO reached at least 90%.

(d) Synthesis of an acryl-modified product of an epoxy resin (radiation-sensitive modified resin):

400 Parts by weight of an epoxy resin, "Epikote 1007" manufactured by Shell Chemical Co., was dissolved under heating in 50 parts by weight of toluene and 50 parts by weight of methyl ethyl ketone. Thereafter, 0.006 part by weight of N,N-dimethylbenzylamine and 0.003 part by weight of hydroquinone were added to the solution, and the temperature was raised to 80° C. Then, 69 parts by weight of acrylic acid was added dropwise, and the reaction was carried out at 80° C. until the acid value became 5 or lower.

Synthesis of an acryl-modified product of a phenoxy resin (radiation-sensitive modified resin):

600 Parts by weight of a phenoxy resin having OH groups, "PKHH", manufactured by UCC and 1800 parts by weight of methyl ethyl ketone were charged into a four-necked flask of a 3-liter capacity, and the mixture was heated and dissolved. After raising the temperature to 80° C., 6.0 parts by weight of a 2-hydroxyethyl methacrylate adduct of tolylene diisocyanate was added, followed by further addition of 0.012 part by weight of tin octylate and 0.012 part by weight of hydroquinone. Then, the reaction was carried out at 80° C. in a nitrogen ($N^2$) stream until the conversion of NCO reached 90%. The phenoxy-modified product had a molecular weight of 35,000 and the number of double bonds per molecule is 1.

(e) Synthesis of an acryl-modified product of a urethane elastomer (radiation-curable elastomer): 250 Parts by weight of an isocyanate-terminated diphenylmethane diisocyanate (MDI) type urethane prepolymer, "Nipporan 3119", manufactured by Nippon Polyurethane Industry Co., 32.5 parts by weight of 2HEMA, 0.07 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95%.

(f) Synthesis of an acryl-modified product of a polyether type terminal urethane-modified elastomer (radiation curable elastomer):

250 Parts by weight of a polyether, "PTG-500" manufactured by Nippon Polyurethane Industry, 32.5 parts by weight of 2HEMA, 0.007 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the raction vessel to be in a range of from 80° to 90° C. After completion of the dropwise addition, the reaction was conducted at 80° C. until the conversion of NCO reached at least 95%.

(g) Synthesis of an acryl-modified product of a polybutadiene elastomer (radiation curable elastomer):

250 Parts by weight of a low molecular weight hydroxyl-terminated polybutadiene, "Poly-BD-Liquid Resin R-15" manufactured by Sinclair Petrochemicals, Inc., 32.5 parts by weight of 2HEMA, 0.007 part by weight of hydroquinone, 0.009 part by weight of tin octylate were charged into a reaction vessel, and dissolved under heating at 80° C. Then, 43.5 parts by weight of TDI was added dropwise, while cooling to control the temperature inside of the reaction vessel to be in a range of from 80° to 90° C. After completion of the dropwise addition, the reaction was conducted at 80° C. until the conversion of NCO reached at least 95%.

Among high-polymer substances, there have been known those which undergo decomposition when irradiated with radiation rays and those which undergo cross-linking among the molecules by the irradiation with radiation rays. Those which undergo cross-linking among the molecules include polyethylene, polypropylene, polystyrene, polyacrylic acid ester, polyacrylamide, polyvinyl chloride, polyester, polyvinyl pyrrolidone rubbers, polyvinyl alcohol and polyacrolein. Such cross-linking type polymers can be used as radiation curable coating resins, as they are, i.e. without subjecting them to any particular modifying treatment as mentioned above, since they undergo a cross-linking reaction without such treatment.

Furthermore, according to this method, even a non-solvent type resin can effectively be used, since it can be cured in a short period of time without requiring any solvent.

The radiation curable coating material in the present invention is obtainable by using the above-mentioned compounds. The compound containing an acrylic double bond and having a molecular weight of at least 400, may be used alone. However, in such a case, as the molecular weight increases, the electron beam-curing property tends to decrease in connection with the density of the functional groups, whereby a higher radiation dose will be required, and the heat resistance tends to be poor as the curing property decreases. Further, in some cases, the adhesion of the undercoating layer tends to be impaired as the curing property increases.

On the other hand, in the case of an electron beam-curable resin having a molecular weight of less than 400, there will be a problem in the adhesion of the undercoating layer, although the electron curing property, the solvent resistance and the heat resistance will be improved. Thus, when a compound containing an acrylic double bond and having a molecular weight of at least 400 or less than 400, is used alone, it is rather difficult to obtian a undercoating material which satisfies various requirements in a well-balanced condition for various characteristics required for a magnetic recording medium.

Whereas, it is possible to obtain satisfactory adhesion and curing property by a combination of at least two compounds having different molecular weights.

Measurement of an Average Molecular Weight of a Binder by GPC

GPC (Gel Permeation Chromatography) is a method of separating molecules in a test sample depending upon their sizes in a mobile phase, wherein a porous gel functioning as a molecular sieve is filled in a column whereby liquid chromatography is conducted. For the calculation of an average molecular weight, a polystyrene having a known molecular weight is used as a standard sample, and a calibration curve is prepared based on its eluting time. An average molecular weight calculated as polystyrene is thereby obtained.

$$Mn = \frac{\Sigma NiMi}{\Sigma Ni}$$

where Mn is a number average molecular weight, and Ni is a number of molecules having a molecular weight of Mi in a given polymer substance.

In the present invention, a non-reactive solvent is used as the case requires. There is no particular restriction as to the solvent, and the solvent is suitably selected taking the solubility, compatibility, etc. of the binder into consideration. For instance, a ketone such as acetone, methyl ethyl ketone, methyl isobutyl ketone or cyclohexanone; an ester such as ethyl formate, methyl acetate, ethyl acetate, butyl acetate, acetic acid glycol monoethyl ether or ethyl lactate; an alcohol such as methanol, ethanol, isopropanol, propanol or butanol; an aromatic hydrocarbon such as benzene, toluene, xylene or ethylbenzene; an ether such as isopropyl ether, ethyl ether, glycol dimethyl ether, glycol monoethyl ether, glycol ether or dioxane; a furan such as tetrahydrofuran or furfural; a chlorinated hydrocarbon such as methylene chloride, ethylene chloride, carbon tetrachloride, chloroform, ethylene chlorohydrin or dichlorobenzene, and other solvents such as dimethylformamide, may be used alone or in combination as a solvent mixture.

For the magnetic layer of the present invention, a thermoplastic resin or a thermosetting resin may of course be used as a vehicle, and further a radiation curable resin as used for the primer layer may be used so that the magnetic layer is formed by irradiation. In such a case, irradiation to the primer layer and the magnetic layer can be conducted simultaneously.

As the substrate on which the primer layer and the magnetic coating material are applied according to the present invention, there may be employed a polyester film such as polyethylene terephthalate, a polyolefin such as polypropylene, a cellulose derivative such as cellulose triacetate, a polyamide, a polycarbonate, a polysulfone, a polyethylene naphthalate, an aromatic aramide, an aromatic polyester, aluminum or glass. However, the useful substrate is not restricted to these specific examples. Particularly preferred among them are a polyester and a polyimide.

As the dispersing agent for the undercoating layer and the magnetic recording layer, there may be employed an organic titanium coupling agent, a silane coupling agent or a surfactant. As the antistatic agent, there may be employed a natural surfactant such as saponin; a nonionic surfactant such as an alkylene oxide-type, a glycerin-type or a glycydol-type; a cationic surfactant such as a higher alkyl amine, a quaternary ammonium salt, pyridine or other heterocyclic compound, phosphonium or a sulfonium; an anionic surfactant containing acid groups such as carboxylic acid groups, sulfonic acid groups, sulfate groups or phosphate groups; or an amphoteric surfactant such as an amino acid, an amino sulfonic acid or a sulfuric acid or phosphoric acid ester of an amino alcohol.

As the lubricant for the undercoating layer or the magnetic recording layer, there may be mentioned e.g. silicone oil, fluorine oil, a fatty acid, a fatty acid ester, a praffin, a liquid paraffin or a surfactant which has been commonly used. However, it is particularly preferred to use a fatty acid and/or a fatty acid ester.

As the fatty acid, there may be mentioned a fatty acid having at least 12 carbon atoms (RCOOH where R is an alkyl group having at least 11 carbon atoms) such as caprylic acid, capric acid, lauric acid, myristic acid, palmitic acid, stearic acid, behenic acid, oleic acid, elaidic acid, linolic acid, linolenic acid or stearolic acid. As the fatty acid ester, there may be employed a fatty acid ester of a monobasic fatty acid having from 12 to 16 carbon atoms with a monohydric alcohol having from 3 to 12 carbon atoms or a fatty acid ester of a monobasic fatty acid having at least 17 carbon atoms with a monohydric alcohol having carbon atoms in a total cf from 21 to 23 as added with the number of carbon atoms of the fatty acid. Further, metallic soaps of the abovementioned aliphatic acids with alkali or alkaline earth metals and lecithin may also be used.

As the silicone, there may be employed a fatty acid-modified silicone or a partially fluorinated silicone. As the alcohol, there may be employed a higher alcohol. As the fluorine oil, there may be employed those produced by electrolytic substitution, telomerization or oligomerization.

Among the lubricants, radiation curable type lubricants may be advantageously employed to prevent the transfer of the roughness of the rear side to the ferromagnetic thin layer or to reduce dropouts or the difference in the output as between the outside and the inside of the roll of a rolled tape, and to make the production on-line possible. Such radiation curable lubricants include compounds containing in their molecules molecular chains exhibiting lubricating properties and acrylic double bonds, such as acrylates, methacrylates, vinyl acetates, acrylic acid amide compounds, vinyl alcohol esters, methyl vinyl alcohol esters, allyl alcohol esters and glycerides. These lubricants may be represented by the following structural formulas:

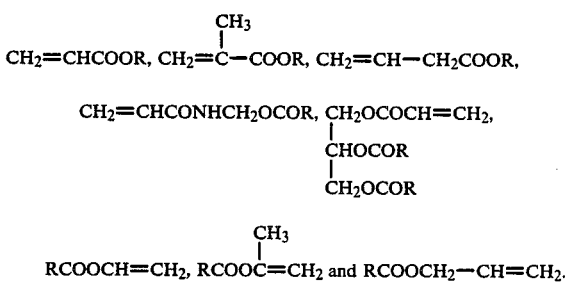

In the above formulas, R is a straight chain or branched, saturated or unsaturated hydrocarbon group having at least 7 carbon atoms, preferably from 12 to 23 carbon atoms, which may be substituted by fluorine. As the fluorinated substituents, there may be mentioned

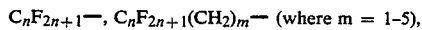

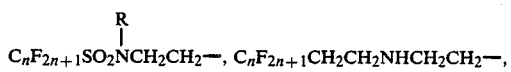

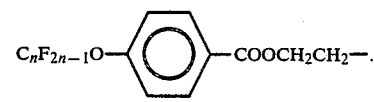

The undercoating layer may contain an inorganic pigment. The magnetic recording layer may contain an inorganic pigment, a conductive material and the aforementioned surfactant.

As the inorganic pigment, there may be mentioned (1) conductive carbon black or graphite, or (2) an inorganic filler such as $SiO_2$, $TiO_2$, $Al_2O_3$, $Cr_2O_3$, SiC, CaO, $CaCO_3$, zinc oxide, geothite, $Fe_2O_3$, talc, kaolin, $CaSO_4$, boron nitride, fluorinated graphite, molybdenum disulfide or ZnS. Further, the following fine particulate pigments (aerosil type or colloidal type) may also be employed: $SiO_2$, $Al_2O_3$, $TiO_2$, $ZrO_2$, $Cr_2O_3$, $Y_2O_3$, $CeO_2$, $Fe_3O_4$, $Fe_2O_3$, $ZrSiO_4$, $Sb_2O_5$ and $SnO_2$. These fine particulate pigments have a particle size of less than 200 Å, preferably at most 150 Å. In the case of $SiO_2$, the fine particulate pigment is available in the form of (1) a colloidal solution of super-fine particles of silicic anhydride (Snowtex (trademark), an aqueous system, a methanol silica sol, etc., manufactured by Nissan Chemical Industries, Ltd.) or (2) super-fine particulate anhydrous silica (Standard product: 100 A)

produced by burning purified silicon tetrachloride (Aerosil (trademark), manufactured by Nippon Aerosil Co., Ltd.). Further, it is possible to use super-fine particulate aluminum oxide and titanium oxide which can be produced by a vapour phase method in the same manner as for the above-mentioned colloidal solution of super-fine particles (1) and the super-fine particulate anhydrous silica (2), as well as the above-mentioned fine particulate pigments. The amount of such an inorganic pigment to be incorporated should preferably be from 20 to 200 parts by weight relative to 100 parts by weight of the binder in the case of (1) and from 10 to 300 parts by weight in the case of (2). When the amount of the inorganic pigment is too large, there will be disadvantages such that the undercoating layer or the magnetic recording layer becomes brittle. In the case of the undercoating layer, the brittleness appears during the running operation, leading to the adhesion to guide poles, which in turn leads to the adhesion to the magnetic layer, or the undercoating layer is likely to be abraded, whereby the surface roughness becomes deteriorated, thus leading to an increase of dropouts. In the case of the magnetic recording layer, there will be practical problems.

With respect to the proportion of carbon black to be incorporated into the undercoating layer of the present invention, the carbon black is preferably from 5 to 200 parts by weight relative to 100 parts by weight of the binder.

Further, with respect to the mixing ratio of the barium ferrite magnetic powder and the organic binder, the weight ratio of the barium ferrite to the binder is usually from 1/1 to 9/1, preferably from 2/1 to 8/1.

The amounts of other additives may readily be determined in accordance with conventional methods.

From the viewpoint of light transmission, the carbon black may advantageously be graphitized carbon black, and may be contained in an amount of at least about 10 parts by weight. For instance, in the combination of a magnetic layer formed by dispersing a barium ferrite magnetic powder in the magnetic layer and coated in a dry thickness of 3 $\mu$m and a primer layer coated in a dry thickness of 0.1 $\mu$m, it is possible to control the light transmission to a level of not higher than 1% by incorporating about 10 parts by weight of carbon black relative to 100 parts by weight of the resin.

The thickness of the magnetic recording layer and the undercoating layer of the present invention is usually within a range of from 0.1 to 10 $\mu$m, respectively.

As the radiation rays to be used for cross-linking or curing of the radiation curable coating composition of the present invention, there may be employed electron beams generated from a radiation accelerator as the source of radiation, $\gamma$-rays generated from $Co^{60}$ as the source of radiation, $\beta$-rays generated from $Sr^{90}$ as the source of radiation, X-rays generated from an X-ray generator as the source of radiation or ultraviolet rays.

From the viewpoints of the easy control of the absorption dose, the introduction to the production line, or the shielding of ionized radiation, it is particularly advantageous to use the radiation rays from the radiation accelerator as the source of radiation.

With respect to the characteristics of the radiation rays to be used for the curing of the magnetic coating layer, it is preferred, from the aspect of the penetrating power, to irradiate by means of the radiation accelerator having an acceleration voltage of from 100 to 750 KV, or preferably from 150 to 300 KV, at an absorption dose in a range of from 0.5 to 20 Mrad.

A photosensitizer may be incorporated into the radiation curable coating material of the present invention to make it suitable for ultraviolet curing. As such a photosensitizer, there may be employed conventional sensitizers, for example, a benzoin type sensitizer such as benzoin methyl ether, benzoin ethyl ether, $\alpha$-methyl benzoin or $\alpha$-chlorodeoxybenzoin; a ketone such as benzophenone or an acetophenone bisdialkylaminobenzophenone; a quinone such as anthraquinone or phenanthraquinone; or a sulfide such as benzyl disulfide or tetramethylthiuram disulfide. The photosensitizer is used in an amount of from 0.1 to 10% by weight relative to the resin solid content.

The magnetic recording medium of the present invention may be produced by a usual manner. For instance, a mixed dispersion comprising a magnetic powder, a binder and other additives is applied on the non-magnetic substrate or on the undercoating layer, and while drying the dispersion, it is exposed to the perpendicular orientation magnetic field to perpendicularly orient magnetic particles. Immediately thereafter, the binder is subjected to curing or cross-linking to obtain a desired magnetic recording medium.

As the typical orientation method, there may be employed a permanent magnet, a direct current magnetic field and an alternating current magnetic field. Further, various combinations thereof may also be employed such as a combination of a perpendicular orientation with a horizontal orientation, a combination of a permanent magnet or a direct current magnetic field with an alternating current magnetic field, a mechanical orientation, or a combination of a mechanical orientation with the above combinations.

It is necessary to conduct the drying operation in the magnetic field so that the oriented magnetic particles will not be disturbed or disoriented due to the diamagnetic field outside the magnetic field. Namely, it is necessary to dry them in the magnetic field so that the magnetic particles will be prevented from mobilization even when the diamagnetic field is applied thereto.

Further, the magnetic recording medium of the present invention may be provided with a back coating layer. In the back coating layer, additives such as an inorganic pigment, a lubricant, a dispersing agent and an antistatic agent, which are commonly employed, may be incorporated together with a thermoplastic resin, a thermosetting resin or a radiation curable resin as the binder. Among the resins, the radiation curable type is preferred in view of its influence over the electromagnetic conversion characteristics or the dropouts, or in view of the economical advantage. As the additives, those useful for the magnetic recording layer may likewise be employed. Among them, graphitized carbon black is preferably incorporated into the back coating layer, whereby a magnetic recording medium having excellent properties is obtainable.

Now, the present invention will be described in further detail with reference to Examples and Comparative Examples. However, it should be understood that the present invention is by no means restricted by these specific Examples.

| Undercoating layer 1 | |
| --- | --- |
| | Parts by weight |
| Carbon black, 20 m$\mu$m | 50 |

-continued

| Undercoating layer 1 | |
|---|---|
| | Parts by weight |
| (A) Acryl-modified vinyl chloride-vinyl acetate-vinyl alcohol copolymer having a molecular weight of 45,000. | 50 |
| (B) Acryl-modified polyurethane elastomer having a molecular weight of 5,000. | 50 |
| Stearic acid | 2 |
| Butyl stearate | 2 |
| Solvent mixture (MIBK/toluene = 1/1) | 300 |

The mixture having the above composition was dispersed in a ball mill for five hours, and the dispersed mixture was coated on a polyester film having a thickness of 33 $\mu$m, in such a manner that the thickness of the undercoating layer upon drying would be 0.7 $\mu$m. Then, this undercoating layer was irradiated with electron beams in a nitrogen ($N_2$) gas by means of an electron curtain type electron beam accelerator at an accelerating voltage of 150 KeV, at an electrode current of 10 mA, and at an absorption dose of 5 Mrad.

| Undercoating layer 2 | |
|---|---|
| | Parts by weight |
| Graphitized carbon black #4000B (30 m$\mu$m) | 50 |
| Acryl-modified vinyl chloride-vinyl acetate-vinyl alcohol copolymer having a molecular weight of 30,000. | 40 |
| Acryl-modified polyurethane elastomer having a molecular weight of 20,000. | 40 |
| Polyfunctional acrylate having a molecular weight of 1,000 | 20 |
| Myristic acid | 4 |
| Solvent mixture (MIBK/toluene) | 250 |

The above mixture was treated in the same manner as for the production of the undercoating layer 1.

| Undercoating layer 3 | |
|---|---|
| | Parts by weight |
| Carbon black, 30 m$\mu$m | 60 |
| $SiO_2$ (by method (2)), 50 m$\mu$m | 40 |
| Phenoxy acrylate-modified product having a molecular weight of 30,000 | 20 |
| Acryl-modified polyurethane elastomer having a molecular weight of 30,000. | 50 |
| Trimethylolpropane | 20 |
| Oleic acid | 4 |
| Methacrylate stearate | 2 |
| Solvent mixture (MIBK/toluene = 1/1) | 300 |

The above mixture was treated in the same manner as for the production of the undercoating layer 1.

Comparative undercoating layers

Comparative undercoating layers 1, 2 and 3 were prepared in the same manner as for the undercoating layers 1, 2 and 3, respectively, except that no carbon black was incorporated.

| Magnetic layer 1 (thermosetting-type magnetic layer) | |
|---|---|
| | Parts by weight |
| Barium ferrite magnetic powder (diameter: 0.1 $\mu$m, thickness: 0.015 $\mu$m, Hc: 1000 Oe) | 120 |
| $\alpha$-$Al_2O_3$ powder (0.5 $\mu$m, particulate) | 2 |
| Dispersant (purified soybean lecithin) | 3 |
| Solvent (MEK/toluene: 50/50) | 100 |

The mixture having the above composition was mixed in a ball mill for 3 hours to adequately wet the hexagonal system plate crystal barium ferrite with the dispersant.

Then, the following mixture was thoroughly mixed and dissolved.

| | Parts by weight |
|---|---|
| Vinyl chloride-vinyl acetate copolymer (VAGH, manufactured by Union Carbide Co.) | 15 |
| Thermoplastic urethane resin (Nippolan 3022, manufactured by Nippon Polyurethane Industry Co.) | 15 |
| Solvent (MEK/toluene: 50/50) | 200 |
| Lubricant (higher fatty acid-modified silicone oil) | 3 |

The mixture thus obtained was introduced into the ball mill where the magnetic powder was treated, and the mixture was dispersed again for 42 hours. After the dispersing, 5 parts by weight (as solid content) of an isocyanate compound (Desmodule L, manufactured by Bayer AG) reactive and cross linkable with functional groups composed mainly of hydroxyl groups of the binder in the magnetic coating material, was mixed with the above coating material in the ball mill for 20 minutes.

The magnetic coating material thus prepared was applied, in a thickness of 3 $\mu$m, onto an undercoating layer formed on a polyester film having a thickness of 33 $\mu$m, perpendicularly oriented on a permanent magnet (3000 gauss) while drying it, and the solvent was evaporated by means of an infrared lamp or hot air. Then, the coated film was subjected to surface smoothing treatment, and then kept in a rolled state in an oven maintained at 80° C. for 48 hours to promote the cross linking reaction by the isocyanate.

From FIG. 1, it is evident that the perpendicular orientation degree changes as the aspect ratio of the hexagonal system plate crystal barium ferrite in the magnetic layer is changed. When the aspect ratio is less than 6, the perpendicular orientation degree is inadequate. On the other hand, when the aspect ratio is 6 or more, the perpendicular orientation is readily obtainable.

From Table 1, it is evident that the particle size is preferably at most 0.1 $\mu$m in respect of electromagnetic conversion characteristics. However, it is possible to employ the one having a particle size of up to 0.2 $\mu$m from a practical point of view.

TABLE 1

| Particle size ($\mu$/m) | C/N |
|---|---|
| 0.30 | −8 |
| 0.20 | −3 |
| 0.15 | −2 |
| 0.10 | 0 |
| 0.08 | +0.2 |
| 0.07 | +0.4 |

Magnetic layer 1'

Magnetic layer 1' was prepared in the same manner as for Magnetic layer 1 except that 5 parts by weight of carbon black (20 mμm) was further added to the component of the magnetic layer 1.

Magnetic layer 2 (radiation curable-type magnetic layer)

|  | Parts by weight |
| --- | --- |
| Barium ferrite (diameter: 0.1 μm, thickness: 0.01 μm, Hc: 800 Oe) | 120 |
| α-Al$_2$O$_3$ powder (0.5 μm, particulate) | 2 |
| Solvent (MEK/toluene: 50/50) | 100 |

The mixture having the above composition was mixed in a ball mill for 3 hours to adequately wet the hexagonal system plate crystal barium ferrite.

Then, the following binder composition was thoroughly mixed and dissolved.

|  | Parts by weight |
| --- | --- |
| Vinyl chloride-vinyl acetate-vinyl alcohol copolymer (containing maleic acid) having a molecular weight of 40,000 | 6 (as solid content) |
| Acrylic double bond-introduced vinyl chloride-vinyl acetate copolymer (containing maleic acid) having a molecular weight of 20,000 | 12 (as solid content) |
| Acrylic double bond-introduced polyether urethane elastomer having a molecular weight of 40,000 | 9 (as solid content) |
| Pentaerythritol triacrylate | 3 |
| Solvent (MEK/toluene: 50/50) | 200 |
| Stearic acid | 4 |
| Butyl stearate | 2 |
| Solvent (MEK/Toluene 50/50) | 200 |

The binder mixture was introduced into the ball mill wherein the magnetic powder was previously treated, and the mixture was again mixed and dispersed for 42 hours.

The magnetic coating material thus obtained was applied onto an undercoating layer formed on a polyester film having a thickness of 33 μm, and perpendicularly oriented on a parmanent magnet (3000 gauss) while drying it. After evaporating the solvent by means of an infrared lamp or hot air, the coated film was subjected to surface smoothing treatment, and then electron beams were irradiated by means of an electro curtain-type electron beam accelerator manufactured by ESI Company at an acceleration voltage of 150 KeV at an electrode current of 20 mA and at a total dose of 5 Mrad in a nitrogen atmosphere, to cure the coating layer.

Magnetic layer 2'

Magnetic layer 2' was prepared in the same manner as for the magnetic layer 4 except that 5 parts by weight of graphitized carbon black (#4000B) was further added to the component of the magnetic layer 2.

Each of the above magnetic layers was combined with each of the undercoating layer.

EXAMPLE 1

A magnetic recording medium obtained by firstly forming the undercoating layer 1 and then forming the magnetic layer 1.

EXAMPLE 2

A magnetic recording medium prepared by forming the undercoating layer 1 and continuously forming the magnetic layer 2 on-line.

EXAMPLE 3

A magnetic recording medium comprising the undercoating layer 2 and the magnetic layer 1 (prepared in the same manner as in Example 1).

EXAMPLE 4

A magnetic recording medium comprising the undercoating layer 2 and the magnetic layer 2 (prepared in the same manner as in Example 2).

EXAMPLE 5

The magnetic recording medium comprising the undercoating layer 3 and the magnetic layer 1 (prepared in the same manner as in Example 1).

EXAMPLE 6

A magnetic recording medium comprising the undercoating layer 3 and the magnetic layer 2 (prepared in the same manner as in Example 2).

The characteristics of these magnetic recording media are shown in Table 2.

TABLE 2

| | Electric resistance Ω/cm$^2$ | Dropouts | During the running operation | | | Adhesive strength (g) | Light transmittance |
| --- | --- | --- | --- | --- | --- | --- | --- |
| | | | Winding appearance | Pressed scars on the magnetic surface side | Deposition of foreign matters and adhesion to guide poles | | |
| Example 1 | 6 × 10$^9$ | 80 | ○ | ○ | ○ | 105 | 0.3 |
| Example 2 | 2 × 10$^9$ | 60 | ○ | ○ | ○ | 115 | 0.4 |
| Example 3 | 8 × 10$^9$ | 80 | ○ | ○ | ○ | 115 | 0.2 |
| Example 4 | 5 × 10$^9$ | 60 | ○ | ○ | ○ | 110 | 0.1 |
| Example 5 | 3 × 10$^9$ | 80 | ○ | ○ | ○ | 110 | 0.1 |
| Example 6 | 9 × 10$^9$ | 60 | ○ | ○ | ○ | 110 | 0.1 |
| Comparative Example 1 | 1 × 10$^{15}$ | 200 | X | X | X | 120 | 3.8 |
| Comparative Example 2 | 2 × 10$^{15}$ | 250 | X | X | X | 120 | 1.5 |

It is evident from Table 2 that by incorporating carbon black into the undercoating layer, it is possible to reduce the electric charge, substantially reduce the dropouts, improves the winding appearance during the running operation and provide excellent adhesive strength. Further, the light transmittance is low and virtually non-light transmitting. In Table 2, the undercoating layer and the magnetic layer were coated on both sides.

Now, the characteristics of the media wherein the magnetic layers 1 and 2 were replaced, respectively, by the magnetic layers 1' and 2' containing carbon black, are shown in Table 3.

TABLE 3

|  | Electric resistance | Dropouts | Winding appearance |
|---|---|---|---|
| Example 1' | $6 \times 10^7$ | 45 | ○ |
| Example 2' | $2 \times 10^7$ | 25 | ○ |
| Example 3' | $3 \times 10^7$ | 35 | ○ |
| Example 4' | $6 \times 10^7$ | 15 | ○ |
| Example 5' | $2 \times 10^7$ | 45 | ○ |
| Example 6' | $3 \times 10^7$ | 25 | ○ |

It is evident from Table 3 that the electric resistance was further lowered by the incorporation of carbon black into the magnetic layers, whereby the dropouts were reduced, and the winding appearance was further improved.

In Example 4', if the graphitized carbon black in the magnetic layer 2' is replaced by 20 mµm of carbon black, the number of dropouts increases from 15 to 25, thus indicating excellent effects of the graphitized carbon black.

Figure 2:
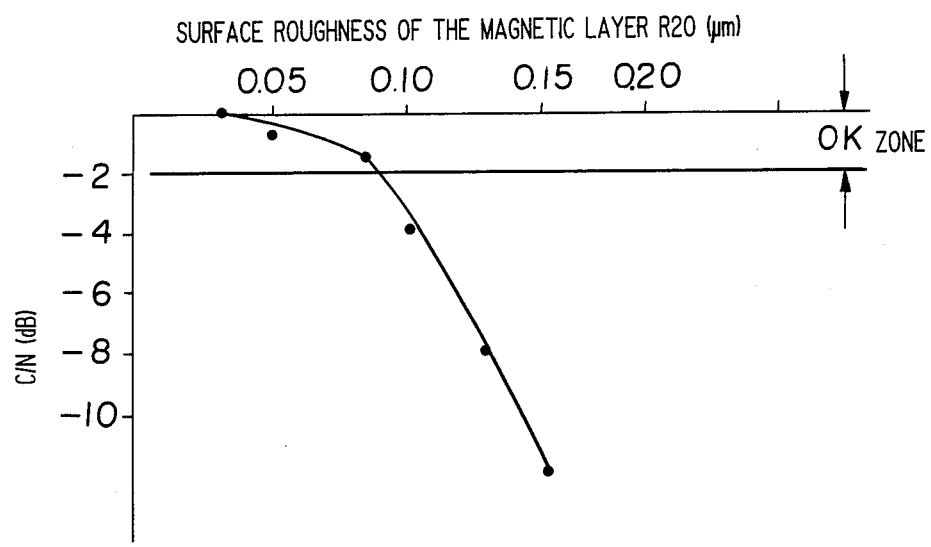
FIG. 2 is a graph illustrating the relation between the surface roughness of the magnetic layer of a magnetic recording medium and the C/N ratio.

Now, the relation between the surface roughness of the magnetic layer and the C/N (dB) is shown in FIG. 2 with respect to the combination of the undercoating layer 2 and the magnetic layer 2, with the substrate thickness of 33 µm, the barium ferrite particle size of 0.08 µm, and the particle thickness of 0.01 µm. FIG. 2 shows the S/N ratios (relative values) in the case where the video tapes were driven at a speed of 3.8 m/sec, and the recording and reproduction were conducted by RF signals with a measure frequency of 7 MHz. As is evident from the Figure, the S/N ratio can be kept at a high level when the surface roughness of the magnetic layer is at most 0.08 µm. The same results were obtained also in other combinations.

Then, by using a substrate having a thickness of 11 µm instead of the above substrate of 33 µm, the undercoating layer and the magnetic layer were coated, and the tape was cut with a width of 8 mm, and evaluated. The results are shown in Table 4. Here, a back coating layer was provided.

tate-vinyl alcohol copolymer (molecular weight: 30,000), an acryl-modified polyurethane elastomer (molecular weight: 50,000), a polyfunctional acrylate (molecular weight: 500) and a polyfunctional acrylate (molecular weight: 200) were employed.

Now, the results obtained in the cases where the magnetic layers 1 and 2 in Table 4 were replaced by the magnetic layers 1' and 2' containing carbon black, are shown in Table 5.

TABLE 5

|  | Electric resistance | Dropouts | Winding appearance |
|---|---|---|---|
| Example 1' | $6 \times 10^7$ | 55 | ○ |
| Example 2' | $2 \times 10^7$ | 35 | ○ |
| Example 3' | $3 \times 10^7$ | 45 | ○ |
| Example 4' | $6 \times 10^7$ | 25 | ○ |
| Example 5' | $2 \times 10^7$ | 55 | ○ |
| Example 6' | $3 \times 10^7$ | 35 | ○ |

It is evident from Table 5 that the electric resistance can further be lowered by incorporating carbon black into the magnetic layer, whereby the dropouts can be reduced, and the winding appearance is further improved.

The above-mentioned various characteristics were measured or evaluated as follows:

1. Running operation

A tape wherein a coating was applied on a substrate film of 33 µm, was permitted to run at a tape speed of 200 m/min. via 50 guide poles during the running operation, whereby the abrasion of the back coating layer, the winding appearance of the jumbo roll, the adhesion to guide poles and the deposition of foreign matters were tested.

2. Electromagnetic conversion characteristics (1) Video floppy

The C-S/N ratio (relative value) when the recording and reproduction were conducted by RF signals at a major frequency of 7 MHz, is shown. The rotational speed was 3600 rpm and the relative speed was 0.6 m/sec.

(2) 8 m/m

The C-S/N ratio (relative value) when the recording and reproduction were conducted with a 8 m/m deck at a major frequency of 7 MHz, is shown. The relative speed was 3.8 m/sec.

3. Winding appearance of the 8 m/m deck

By means of a 8 m/m deck, a tape was fast forwarded for the entire length and then fast rewound and stopped

TABLE 4

|  | Electric resistance ($\Omega$/cm$^2$) | Dropouts (one time) | Winding appearance | Winding appearance during the running operation | Adhesive strength (g) | Light transmittance |
|---|---|---|---|---|---|---|
| Example 1 | $6 \times 10^9$ | 85 | ○ | ○ | 105 | 0.3 |
| Example 2 | $2 \times 10^9$ | 65 | ○ | ○ | 115 | 0.4 |
| Example 3 | $8 \times 10^9$ | 85 | ○ | ○ | 115 | 0.2 |
| Example 4 | $5 \times 10^9$ | 65 | ○ | ○ | 120 | 0.1 |
| Example 5 | $3 \times 10^9$ | 85 | ○ | ○ | 120 | 0.1 |
| Example 6 | $9 \times 10^9$ | 65 | ○ | ○ | 120 | 0.1 |
| Comparative Example 1 | $1 \times 10^{15}$ | 600 | X | X | 120 | 3.8 |
| Comparative Example 2 | $2 \times 10^{15}$ | 500 | X | X | 140 | 1.5 |

When a coating is applied onto a substrate as thin as 11 µm, it is better to provide a back coating layer. As the binder for the back coating layer, the above-mentioned combination of (A), (B) and (C) is preferred. In this case, an acryl-modified vinyl chloride-vinyl acewhen the rest of the length was 50 m, and then fast rewound to the end of the tape. Then, the winding condition of the tape was visually observed. Good winding where no space was observed in the tape winding, was designated by ○, and inferior winding where a space was observed in the tape winding, was designated by X.

4. Abrasion of the back coating layer by 8 m/m deck

By means of a commercialy available 8 m/m deck, a tape was permitted to run 50 times, whereupon the stain inside the cassette case was observed. Symbol indicates that no stain was observed, and symbol indicates that substantial stains were observed.

5. Electron microscopic photography

An average particle size was determined by an extraction method from the tape by a transmission electron microscope.

6. Surface roughness

The surface roughness was obtained by 20 point average method from the chart obtained by means of Talystep (manufactured by TAYLOR-HOBSON CO.). A cut off of 0.17 mm and a needle-pressure of $0.1 \times 2.5$ $\mu$m were employed.

7. pH

The pH was measured in accordance with JIS K-6221-1982 "Testing method for carbon black for rubber".

According to the present invention, it is possible to substantially reduce the surface resistance of the magnetic layer by providing a carbon black-containing undercoating layer beneath the magnetic recording layer in the magnetic recording medium comprising a nonmagnetic substrate and a coating type magnetic recording layer formed thereon wherein barium ferrite magnetic powder is perpendicularly oriented, whereby the electric charge and the accompanying problems such as the adhesion of the tape or dropouts, and the problem of poor winding appearance can be eliminated. Further, the adhesive strength between the substrate and the magnetic recording layer is high, and the light transmittance is low to make the medium non-light transmitting, whereby a problem of operational errors in the optical control for automatic stopping of tape measurement, etc. can be solved, and an excellent recording medium can be presented.

The magnetic recording medium of the present invention is suitable as a high density recording medium such as a digital audio tape, a floppy disc, a video floppy disc, etc.

What is claimed is:

1. A magnetic recording medium comprising a non-magnetic substrate and a magnetic recording layer formed on the substrate consisting essentially of a single layer of barium ferrite magnetic powder, perpendicularly oriented, dispersed in a resin binder, wherein said recording layer contains carbon black, has a surface roughness of at most 0.08$\mu$ as measured by a 20 point average method and wherein said barium ferrite magnetic powder has a partilce size of at most 0.02$\mu$ and an aspect ratio of at least 6, characterized in that an undercoating layer comprising a radiation curable binder and carbon black, is provided beneath the magnetic recording layer.

2. The magnetic recording medium according to claim 1, wherein carbon black in the undercoating layer is used in an amount of from 5 to 200 parts by weight relative to 100 parts by weight of the binder.

3. The magnetic recording medium according to claim 1, wherein the carbon black in the magnetic layer is graphitized.

* * * * *